US008159701B2

(12) United States Patent  (10) Patent No.: US 8,159,701 B2
Edmonds  (45) Date of Patent: *Apr. 17, 2012

(54) PRINTER DRIVER, APPARATUS AND METHODS FOR CONROLLING A PRINTER FROM A DEVMODE DATA STRUCTURE

(75) Inventor: Jonathan Allen Edmonds, Silverton, OR (US)

(73) Assignee: Xerox Corporation, Norwalk, CT (US)

( * ) Notice: Subject to any disclaimer, the term of this patent is extended or adjusted under 35 U.S.C. 154(b) by 1237 days.

This patent is subject to a terminal disclaimer.

(21) Appl. No.: 11/778,829

(22) Filed: Jul. 17, 2007

(65) Prior Publication Data

US 2009/0021769 A1  Jan. 22, 2009

(51) Int. Cl.
*G06F 3/12*  (2006.01)
(52) U.S. Cl. ...... 358/1.15; 358/1.13; 715/204; 715/273; 715/735
(58) Field of Classification Search ........... 358/1.1–3.23
See application file for complete search history.

(56) References Cited

U.S. PATENT DOCUMENTS

| | | | |
|---|---|---|---|
| 5,872,569 A | 2/1999 | Salgado | |
| 5,987,535 A | 11/1999 | Knodt et al. | |
| 6,470,155 B1 | 10/2002 | Martin et al. | |
| 6,748,183 B2 | 6/2004 | Edmonds | |
| 2004/0051891 A1* | 3/2004 | Moro et al. | 358/1.9 |
| 2006/0170943 A1* | 8/2006 | Hanson et al. | 358/1.13 |
| 2006/0221372 A1* | 10/2006 | Onishi et al. | 358/1.13 |

* cited by examiner

*Primary Examiner* — Benny Tieu
*Assistant Examiner* — Marcellus Augustin
(74) *Attorney, Agent, or Firm* — Ronald E. Prass, Jr.; Prass LLP (57) ABSTRACT

Disclosed are methods of controlling operation of a printer, apparatus and computer-readable medium. The embodiments control operation of a printer by receiving a print command for printing from a user, displaying a print user interface including selectable document settings, receiving an indication from the user of selected ones of the documents settings, receiving an indication from the user to save the selected document settings as an application default setting corresponding to an application, and controlling printing of documents opened in the application to print on the printer using the application default setting and the selected document settings.

20 Claims, 5 Drawing Sheets

PRINTER DRIVER, APPARATUS AND METHODS FOR CONROLLING A PRINTER FROM A DEVMODE DATA STRUCTURE

CROSS REFERENCE TO RELATED APPLICATIONS

This application is related to the following US applications, filed simultaneously with this application, and the disclosures of which are incorporated by reference herein in their entirety: 1) Ser. No. 11/778,851; 2) Ser. No. 11/778,868; 3) Ser. No. 11/778,883; and 4) Ser. No. 11/778,901.

BACKGROUND

Disclosed herein are methods for controlling operation of a printer, and in particular to such methods that use application specific default settings, as well as corresponding apparatus and computer-readable medium.

Image forming devices such as printers, copiers and multi-function devices provide users the ability to print from a device such as a desktop or laptop computer, a handheld computer, or other electronic devices to a printer connected to the device. The electronic devices may be stand alone devices, or may be connected in a network, such as in a business computing environment, which may include one or more printers.

In order for a printer to interface with and function with the computer to which it is connected, a printer driver can typically be installed on the computer. A printer driver is software which controls the printer from the computer. The printer driver may include a user interface which may be typically accessed by a user through an operating system or an application program, such as a word processing program, a spreadsheet program, or other types of programs, and viewed on a display.

Printer drivers in use may include default settings. The default settings may allow a user to set and save default settings for use with the printer. For example, a user may be able to set default settings such as paper size, tray to print from, draft or high-quality mode, various color options, page layout, and the like. When such default settings are set, and the user later prints, the default settings will automatically be used, usually unless the user manually changes one or more of the settings. The default settings will also apply across all applications that the printer is used with. For example, the default setting would be used when printing from a word processing application, from a spreadsheet application, from a drawing application, from a browser application, and the like. A user may want to save default settings for the printer that are specific to a particular application, and save different default settings for other applications. Current printer drivers do not provide this functionality.

SUMMARY

According to aspects of the embodiments, there is provided methods of controlling operation of a printer, apparatus and computer-readable medium. The embodiments control operation of a printer by receiving a print command for printing from a user, displaying a print user interface including selectable document settings, receiving an indication from the user of selected ones of the documents settings, receiving an indication from the user to save the selected document settings as an application default setting corresponding to an application, and controlling printing of documents opened in the application to print on the printer using the application default setting and the selected document settings.

DETAILED DESCRIPTION

Aspects of the embodiments disclosed herein relate to methods for controlling operation of a printer, and corresponding apparatus and computer readable medium. The disclosed embodiments allow a user to select and save one or more document settings as an application default setting to be used when printing documents from that particular application.

The disclosed embodiments include methods for receiving a print command for printing from a user, displaying a print user interface including selectable document settings, receiving an indication from the user of selected ones of the documents settings, receiving an indication from the user to save the selected document settings as an application default setting corresponding to an application, and controlling printing of documents opened in the application to print on the printer using the application default setting and the selected document settings.

The disclosed embodiments further include an apparatus for controlling printing of a document on a printer. The apparatus includes a memory that stores print driver instructions; and a processor that executes the print driver instructions to cause printing of the document when receiving a print command for printing from a user by: receiving an indication from the user of selected ones of the documents settings; receiving an indication from the user to save the selected document settings as an application default setting corresponding to an application; and controlling printing of documents opened in the application to print on the printer using the application default setting and the selected document settings.

The disclosed embodiments further include a computer-readable medium comprising, a computer-usable data carrier storing instructions, the instructions when executed by a computer causing the computer to control printing by: receiving a print command for printing from a user; receiving an indication from the user of selected documents settings and to save the selected document settings as an application default setting corresponding to an application; and controlling printing of documents opened in the application to print on the printer using the application default setting and the selected document settings.

The term "application", in the disclosed embodiments, refers to a program designed for end users of a computing device, such as a word processing program, a database program, a browser program, a spreadsheet program, a gaming program, and the like. An application is distinct from systems programs, which are low-level programs that interact with the computing device at a very basic level, such as an operating system program, a compiler program, a debugger program, programs for managing computer resources, and the like.

A printer "document setting" in the disclosed embodiments, refers to a setting of an attribute of a document to be printed that can be selected and saved by the user. Examples of printer document settings are settings for stapled or not stapled, paper size, watermark, paper tray, print resolution, and color printing or black and white printing. A printer "default setting" in the disclosed embodiments, refers to one or more document settings that are saved as a default setting to be automatically used for printing unless manually changed at the time of printing. A printer "application default setting", in the disclosed embodiments, refers to one or more document settings that are saved as an application default setting to be automatically used for printing of documents opened in the application unless the settings are manually changed at the time of printing.

Figure 1:
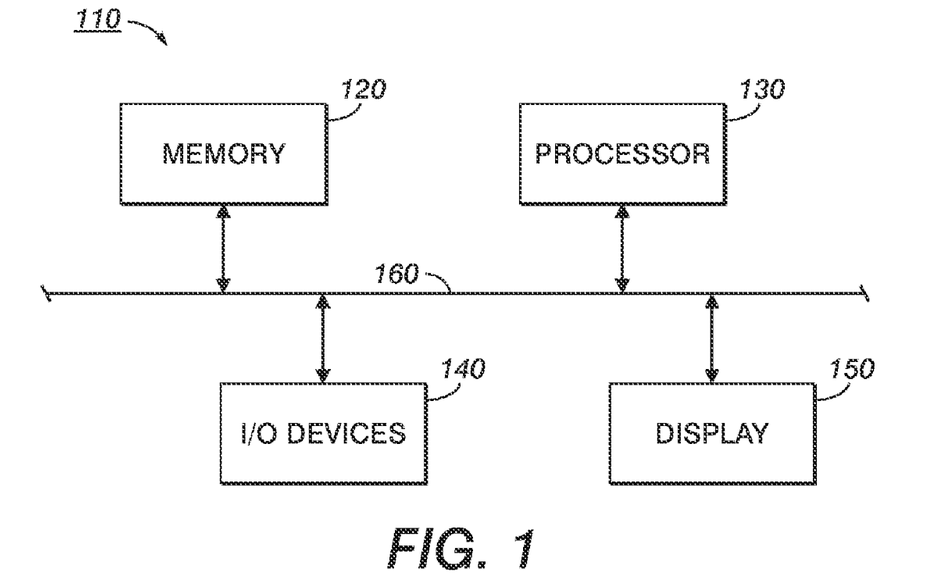
FIG. 1 illustrates a block diagram of a system for controlling a printer.

FIG. 1 illustrates a diagram of a system 110. The system 110 may be embodied within devices such as a desktop computer, a laptop computer, a handheld computer, a handheld communication device, or another type of computing device, or the like. The system 110 may include a memory 120, a processor 130, input/output devices 140, a display 150 and a bus 160. The bus 160 may permit communication and transfer of signals among the components of the computing device 110.

Processor 130 may include at least one conventional processor or microprocessor that interprets and executes instructions. The processor 130 may be a general purpose processor or a special purpose integrated circuit, such as an ASIC, and may include more than one processor section. Additionally, the system 110 may include a plurality of processors 130.

Memory 120 may be a random access memory (RAM) or another type of dynamic storage device that stores information and instructions for execution by processor 130. Memory 120 may also include a read-only memory (ROM) which may include a conventional ROM device or another type of static storage device that stores static information and instructions for processor 130. The memory 120 may be any memory device that stores data for use by system 110.

Input/output devices 140 (I/O devices) may include one or more conventional input mechanisms that permit a user to input information to the system 110, such as a microphone, touchpad, keypad, keyboard, mouse, pen, stylus, voice recognition device, buttons, and the like, and output mechanisms such as one or more conventional mechanisms that output information to the user, including a display, one or more speakers, a storage medium, such as a memory, magnetic or optical disk, disk drive, a printer device, and the like, and/or interfaces for the above. The display 150 may typically be an LCD or CRT display as used on many conventional computing devices, or any other type of display device.

The system 110 may perform functions in response to processor 130 by executing sequences of instructions or instruction sets contained in a computer-readable medium, such as, for example, memory 120. Such instructions may be read into memory 120 from another computer-readable medium, such as a storage device, or from a separate device via a communication interface, or may be downloaded from an external source such as the Internet. The system 100 may be a stand-alone system, such as a personal computer, or may be connected to a network such as an intranet, the Internet, and the like. Other elements may be included with the system 110 as needed.

The memory 120 may store instructions that may be executed by the processor to perform various functions. For example, the memory may store printer driver instructions to allow the system to perform various printing functions in association with a particular printer connected to the system. The printer driver instructions are typically unique to each specific type of printer, and the system 110 may store a plurality of print drivers each for a different printer.

Figure 2:
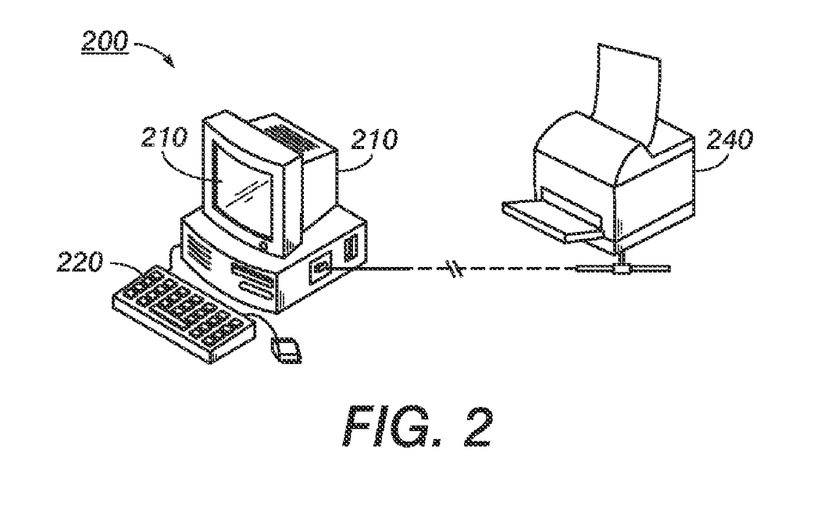
FIG. 2 illustrates a block diagram of a system for controlling a printer.

FIG. 2 illustrates a system 200. The system 200 includes a computer 210, which includes the elements of system 110, including the memory 120, the processor 130, I/O devices 140 and a display 150. The computer 210 could be a standard personal computer, or could be another type of computing device such as a handheld computer, a phone, a laptop computer, and the like.

The system 200 may also include a keyboard 220 functioning as an input device. The keyboard may be replaced or supplemented by the input devices as illustrated in FIG. 1, for example.

The system 200 may also include a display 230 functioning as an output device for displaying images generated or received by the computer 210, corresponding to display 150 shown in FIG. 1. The display 230 may display images to be viewed by a user, such as various application programs, a user interface (UI), text, photographic images, and the like. For example, the display may generate a user interface in response to a print driver stored in memory 120, such as a user interface for the print driver. The print driver could also be stored in a memory in a network that the computer 210 is connected to, such as in a network server.

The system 200 may have a printer 240 connected thereto for printing data such as images, text, and the like in response to a user directing the computer 210 to print, for example. In response to such a print command, the processor will typically cause the print driver to communicate with the printer to perform the needed printing.

The system 200 may be connected to a network, such as such as an intranet, the Internet, a wireless network, and the like. In addition, the system 200 may be connected to a plurality of printers such as printer 240. The plurality of printers may be of a same printer type or of varying printer types.

Figure 3:
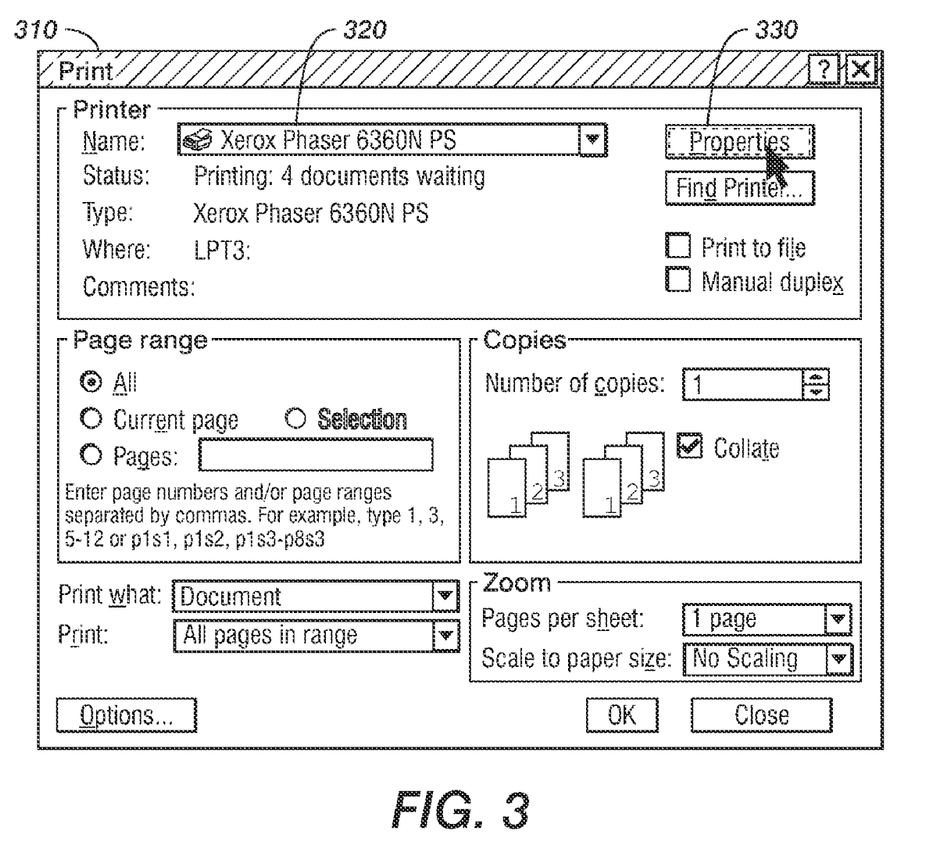
FIG. 3 illustrates a diagram of a print user interface.
Figure 4:
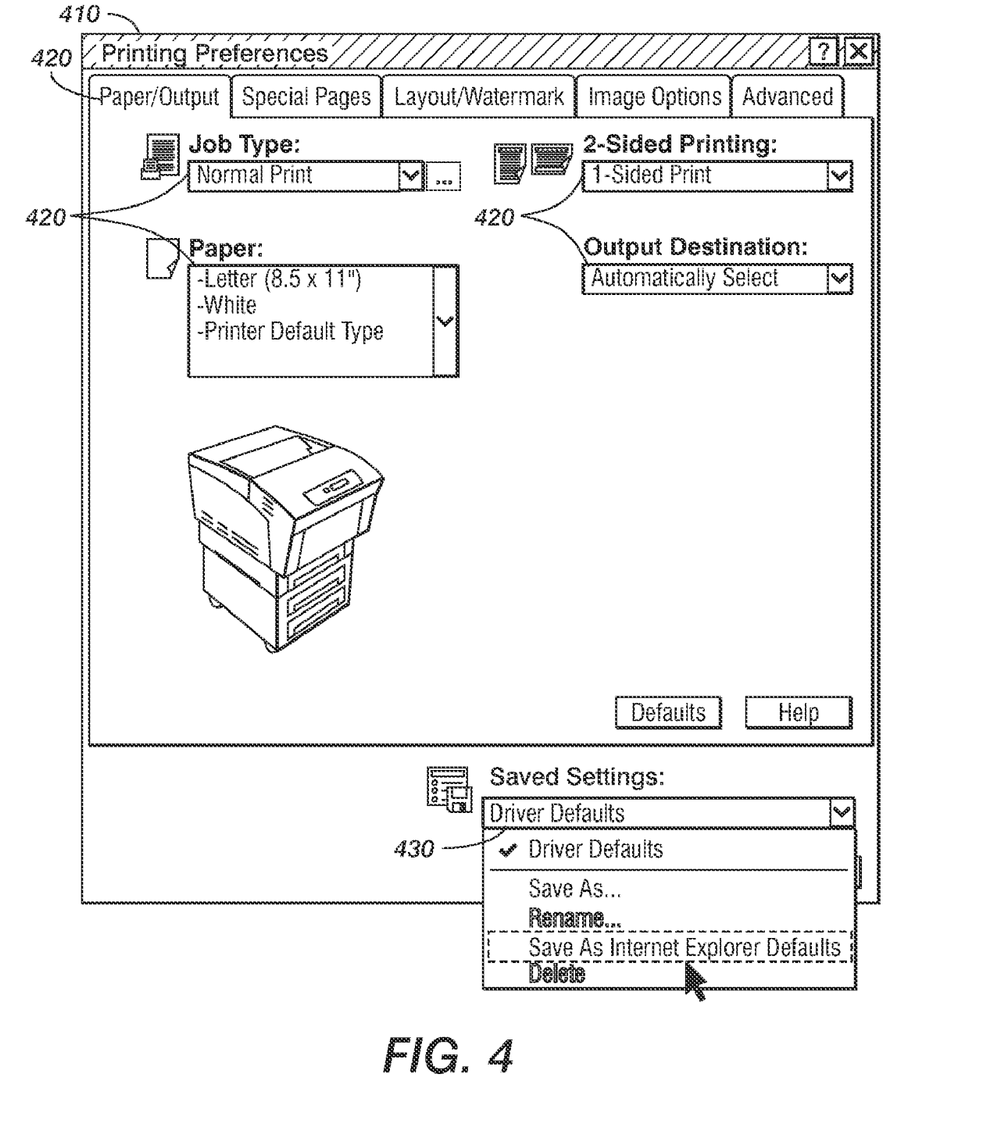
FIG. 4 illustrates a diagram of a print user interface.

FIG. 3 illustrates a printer user interface 310 that may be displayed on a display of computer 210. The printer user interface 310 may be invoked and displayed when a user selects a print function on the computer 210, typically using an input device such as keyboard 220, for example. The user may typically select a printer in the printer selection area 320. The user will typically be able to select from all printers for which a print driver has been loaded into memory of the computer 210. In the case of the FIG. 3 example, the user can select from printers through the use of a drop-down menu, and printers other than the one shown may be selected. Upon selection of properties 330, a further printer user interface 410 will be displayed, as illustrated herein. The print user interfaces 310, 410 are example interfaces, and other print user interfaces may be used.

FIG. 4 illustrates an exemplary diagram of a further printer user interface 410 that may be displayed on a display of computer 210, for example. The printer user interface 410 includes one or more printer document settings 420 that may be selected and set by the user. The document settings 420 are settings of an attribute of a document to be printed, as defined above. The user may select and save different printer document settings 420 prior to printing. For example, the printer document settings may include paper, output, special pages, layout, watermark, image options, advanced, and so forth. The paper setting may allow selection of a paper size, a paper color, or other paper features. The output setting may include a selection of 1 or 2 sided printing, a print quality, a destination, and the like.

A layout setting may allow selection of page layout features such as portrait, landscape, number of sheets per page, and the like. A watermark setting may allow selection of watermark features such as draft, confidential, print in background, and the like. An image options setting may allow selection of features such as application reduce/enlarge, PostScript pass-through, mirrored output, and the like. An advanced setting may allow selection of features such as booklet layout, image color management, and the like. The printer document settings shown and described herein are only examples. Any printer document settings may be used including those that are selectable by the user.

The printer user interface 410 also shows printer default setting 430 that may be saved by a user. After selecting document settings 420, the user may save the printer document settings 420 for use as a printer default setting. This may be accomplished with the printer default settings 430. In the example shown in FIG. 3, this may be done with the use of a drop-down menu, that allows saving of the selected document settings 420 as a printer default setting (driver default), as an application default setting, or under a user selected name.

When the selected printer settings are saved as driver defaults, the printer settings will automatically be used whenever the user selects the corresponding print driver via selection of the printer. Different types of printers have different print drivers, and selection of a particular printer for printing will open the corresponding print driver. If the document settings 420 have previously been saved as driver defaults, they will be automatically used for printing with the corresponding printer unless the user manually changes the saved printer settings.

The user may also save the document settings 420 as a default application setting. When the document settings are saved as a default application setting, anytime the user prints from the default application with the corresponding printer, the application default setting will be used unless the user manually changes the document settings. For example, the user may save the document settings 420 as Internet Explorer Defaults, as shown in FIG. 4. When the user later prints with the corresponding printer from the Internet Explorer application, the Internet Explorer defaults will be invoked for printing. In particular, if the user, after saving the document settings 420 as Internet Explorer Defaults, selects print from the Internet Explorer application, a printer user interface such as printer user interface 310 will be displayed. If the user then selects OK, the printing will commence with the Internet Explorer Application Default Setting, and the document settings that were saved will be used for printing.

Figure 5:
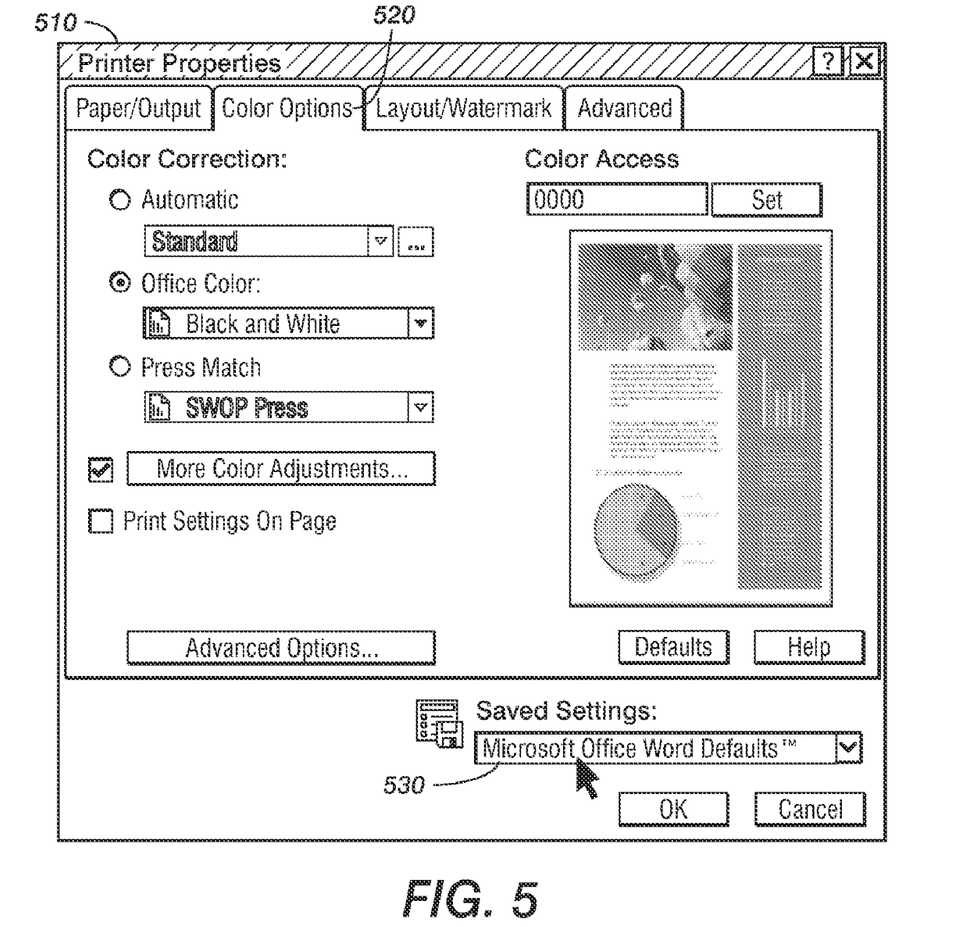
FIG. 5 illustrates a diagram of a print user interface.

FIG. 5 illustrates an exemplary diagram of a further printer user interface 510. The printer user interface 510 is illustrated with the color options document setting selected by a user, and with office color selected to black and white. Additionally, the default application setting 530 has been selected as a Microsoft Office Word Default. The dropdown menu would allow saving this setting in other ways, such as a driver default (not specific to any application), under a default name selected by a user, or for another application.

The print drivers as described herein may provide the user with a printer user interface that gives the user a choice of saving printer document settings as a default application setting of the specific application the user is using at that time. Thus, if the user is in Internet Explorer, the print driver may include the option of save as Internet Explorer defaults, as shown in FIG. 4. Alternatively, the drop-down list may include a list of plural application defaults that the user may choose from, and more than one application default could be saved at the same time.

Additionally, the user can save a first set of document settings (one or more document settings) as a first application default setting for a first application, and save a second set of document settings as a second default application setting for a second application. For example, the user could save a first set of document settings as an Internet Explorer Default Setting and save a second set of document settings as a Word Default Setting. The first and second application default settings may have the same document settings or different document settings. Any number of such application default settings may be saved by a user.

When the user has saved document settings as an application default setting, and later attempts to print from that application, the default application setting will be used for printing. However, the user can manually change one or more of the document settings saved as the default application setting prior to printing. As an example, when the user selects print, the user could manually change the document setting previously saved as 1-sided print option to 2-sided print. If the user does not save this change as a default setting, but instead clicks OK to print, the document will be printed with the 2-sided print option and the other document settings that have been saved as the application default setting.

The user may also save the 2-sided print change as an application default setting, in which case the application default is updated. However, where the user does not save the changed document setting as a default setting, but instead prints without saving the changed document setting, the changed document setting will be temporarily used for printing, but will eventually revert to the originally saved document setting. The reversion to the originally saved document setting for printing will occur either after that particular print job (i.e., when the OK button in the FIG. 3 print user interface is selected and printing occurs), or after the application is closed. In the latter case, the manually changed document setting would be used for printing of later print jobs as long as the application stayed open on the user's computing device.

When applying an application default setting, the document settings are saved in an application default setting during what is called MergeAndConvert in the print driver world. This is when the driver has the opportunity to validate and convert an incoming DEVMODE into a valid DEVMODE. A DEVMODE is a data structure that stores the print settings that are to be applied with a particular job. It may be understood as a rudimentary "Print Ticket" in the form of a block of memory. By specifically targeting this particular callback, the application default setting is inserted into the DEVMODE before the user really has a chance to do anything in the application. Then, if the user selects printing such as through a print icon, or opens up properties in the printer user interface, the application default setting is applied.

However, if the user modifies the document settings in the printer user interface and does not save the modified document settings as an application default setting, a special flag is placed in the DEVMODE data structure to indicate the user has changed their settings in the UI of an application. The flag informs us not to save the changed settings as into the application default setting during MergeAndConvert. As such, once the user has made changes to the documents settings, they will be used during printing until we get a virgin DEVMODE again, which does not occur until the application is re-opened. This seems to follow the ideal usage of most users. However, the flag is not set when opening up the print dialog from within the context of the "Printers and Faxes" folder. In this context, the user is really changing their overall defaults, and is not then set, or it would always be there when we get in the default (virgin) DEVMODE. So, the flag is only set from within an application, and NOT from within the context of the "Printers and Faxes" folder.

Printing from a computer to a printer occurs in one of two modes, direct connect or point and print. Direct connect is where the driver stored on the computer sends print jobs directly to the printer. Point and print is where a server is connected to one or more client computers, the server acts as a print server, and the print jobs go from the client computer to the print server and then to the printer.

In a point and print environment, what typically occurs is the application and the spooler bundle up with is called EMF (Encapsulated Meta File) data, and pass it along with the DEVMODE to the print server. On the print server, the EMF file (Encapsulated Meta File) is actually turned into PDL (e.g. PostScript or PCL). This is when the DEVMODE settings are typically converted into actual commands the printer can understand. However, this occurs on the server, not on the client computer, so the application defaults must have been applied prior to submitting the job to the server, or they could not be found. Accordingly, the application default setting is pushed to the print server before the application is opened, ensuring that it's 'default' DEVMODE was really one that was already manipulated. Specifically, the defaults are set during MergeAndConvert for the DEVMODE callback. Thus, when the DEVMODE is packaged up with the EMF file and sent to the server, it already has the relevant changes made to it, and the output is what the user would have expected.

Embodiments as disclosed herein may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hard-wired, wireless, or combination thereof to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, and the like that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described therein.

Figure 6:
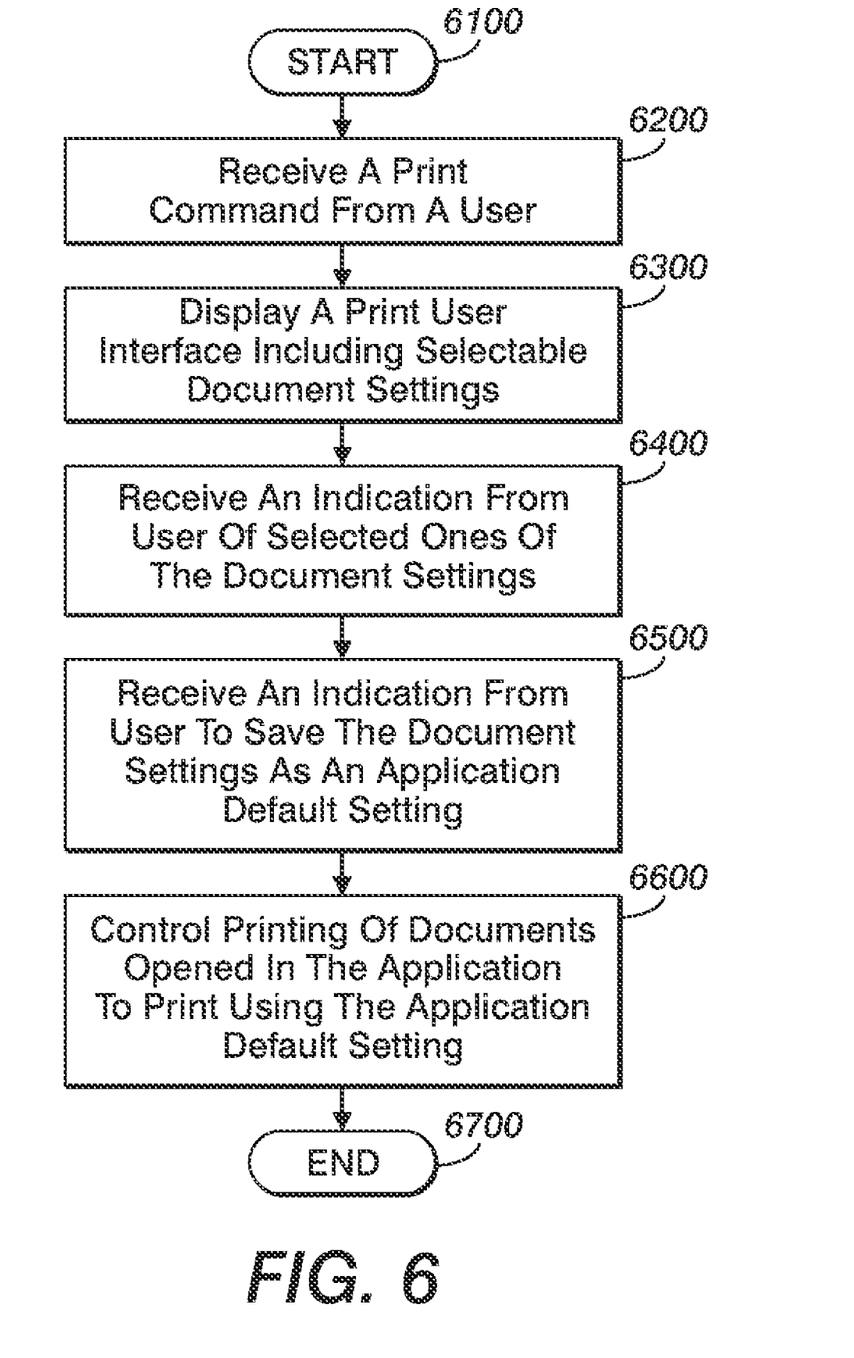
FIG. 6 illustrates a flowchart of a method for controlling a printer.

FIG. 6 illustrates a flowchart of a method of controlling a printer, as was further described above. The method starts at 6100. At 6200, a print command is received from a user. At 6300, a print user interface is displayed, including selectable document settings.

At 6400, an indication is received from the user of selected ones of the document settings. At 6500, an indication is received from the user to save the document settings as an application default setting. At 6600, printing of documents opened in the application is controlled using the application default setting. At 6700, the method ends.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method of controlling operation of a printer, comprising:
   receiving a print command for printing from a user;
   generating a print user interface from a DEVMODE data structure that includes selectable document settings;
   receiving through the print user interface an indication from the user of selected ones of the documents settings;
   receiving through the print user interface an indication from the user to save the selected document settings as an application default setting corresponding to an application;
   in response to receiving an indication from the user to save the selected document settings as an application default setting generating a modified DEVMODE data structure with the application default settings; and
   controlling printing of documents opened in the application to print on the printer using the application default setting and the selected document settings.

2. The method of claim 1, further comprising displaying an option to save the selected document settings as an application default setting and displaying an option to save the document settings as a driver default setting, wherein each application is identified by a user friendly name.

3. The method of claim 1, further comprising:
   receiving from the user a manual change to one or more of the document settings that have been previously saved as an application default setting, after the user has opened a document in the application; and
   controlling printing of the document using the one or more manually changed document settings and using the document settings saved as the application default setting that were not manually changed by the user.

4. The method of claim 3, further comprising controlling printing of other documents later selected by the user for printing from within the application using the one or more manually changed document settings and using the document settings saved as the application default setting that were not manually changed by the user, when the user has not closed the application since the manually changed document settings were selected.

5. The method of claim 4, further comprising controlling printing of the other documents later selected by the user for printing from within the application by reverting to the document settings saved as the application default setting and not using the manually changed document settings selected by the user, if the user has closed the application since the manually changed document settings were selected.

6. The method of claim 1, wherein the selected ones of the document settings are first selected ones of the document settings, and the application default setting is saved as a first application default setting corresponding to a first application, further comprising:

receiving from the user an indication of second selected ones of the document settings;

receiving an indication from the user to save the selected document settings as a second application default setting corresponding to a second application.

7. The method of claim 6, further comprising controlling printing of documents open in the second application to print with use of the second application default setting and the second selected ones of the document settings.

8. The method of claim 2, wherein the document settings each define an attribute of the document to be printed.

9. An apparatus for controlling printing of a document on a printer, comprising:

a memory that stores print driver instructions; and a processor that executes the print driver instructions to cause printing of the document when receiving a print command for printing from a user by:

receiving an indication from the user through a user interface of selected ones of the documents settings, wherein the user interface is generated from a DEVMODE data structure that includes selectable document settings;

receiving an indication from the user to save the selected document settings as an application default setting corresponding to an application;

in response to receiving an indication from the user to save the selected document settings as an application default setting generating a modified DEVMODE data structure with the application default settings; and controlling printing of documents opened in the application to print on the printer using the application default setting and the selected document settings.

10. The apparatus of claim 9, wherein the processor receives an indication from the user to save the document settings as a driver default setting.

11. The apparatus of claim 9, wherein the processor further controls printing by receiving from the user a manual change to one or more of the document settings that have been previously saved as an application default setting, after the user has opened a document in the application, and controlling printing of the document using the one or more manually changed document settings and using the document settings saved as the application default setting that were not manually changed by the user.

12. The apparatus of claim 11, wherein the processor further controls printing of other documents later selected by the user for printing from within the application using the one or more manually changed document settings and using the document settings saved as the application default setting that were not manually changed by the user, if the user has not closed the application since the manually changed document settings were selected.

13. The apparatus of claim 12, wherein the processor further controls printing of the other documents later selected by the user for printing from within the application by reverting to the document settings saved as the application default setting and not using the manually changed document settings selected by the user, if the user has closed the application since the manually changed document settings were selected.

14. The apparatus of claim 9, wherein the selected ones of the document settings are first selected ones of the document settings, and the application default setting is saved as a first application default setting corresponding to a first application, the processor further controlling printing by:

receiving from the user an indication of second selected ones of the document settings;

receiving an indication from the user to save the selected document settings as a second application default setting corresponding to a second application; and controlling printing of documents open in the second application to print with use of the second application default setting and the second selected ones of the document settings.

15. The apparatus of claim 9, wherein the document settings each define an attribute of the document to be printed.

16. A non-transitory computer-readable medium having instructions that when compiled by a processor control printing of a document on a printer comprising:

a computer-usable data carrier storing instructions, the instructions when executed by a computer causing the computer to control printing by:

receiving a print command for printing from a user;

receiving an indication from the user of selected documents settings and to save the selected document settings as an application default setting corresponding to an application, wherein the application is identified by a user friendly name;

in response to receiving an indication from the user to save the selected document settings as an application default setting generating a modified DEVMODE data structure with the application default settings; and controlling printing of documents opened in the application to print on the printer using the application default setting and the selected document settings.

17. The non-transitory computer-readable medium of claim 16, wherein the instructions further comprise instructions causing the computer to control printing by: receiving from the user a manual change to one or more of the document settings that have been previously saved as an application default setting, after the user has opened a document in the application, and using the one or more manually changed document settings and using the document settings saved as the application default setting that were not manually changed by the user.

18. The non-transitory computer-readable medium of claim 17, wherein the instructions further comprise instructions causing the computer to control printing of other documents later selected by the user for printing from within the application using the one or more manually changed document settings and using the document settings saved as the application default setting that were not manually changed by the user, if the user has not closed the application since the manually changed document settings were selected.

19. The non-transitory computer-readable medium of claim 18, wherein the instructions further comprise instructions causing the computer to control printing of the other documents later selected by the user for printing from within the application by reverting to the document settings saved as the application default setting and not using the manually changed document settings selected by the user, if the user has closed the application since the manually changed document settings were selected.

20. The non-transitory computer-readable medium of claim 16, wherein the instructions further comprise instructions causing the computer to control printing by:

receiving from the user an indication of second selected ones of the document settings;

receiving an indication from the user to save the selected document settings as a second application default setting corresponding to a second application; and controlling printing of documents open in the second application to print with use of the second application default setting and the second selected ones of the document settings.

* * * * *